Feb. 6, 1968 J. B. McQUITTY ETAL 3,368,193

DEEP SUBMERGENCE HYDROPHONE

Filed Dec. 5, 1966

INVENTORS
Jim B. McQuitty
Arnat W. Martin

BY

ATTORNEY

AGENT

United States Patent Office 3,368,193
Patented Feb. 6, 1968

3,368,193
DEEP SUBMERGENCE HYDROPHONE

Jim B. McQuitty, Adelphi, and Arnat W. Martin, Spencerville, Md., assignors to the United States of America as represented by the Secretary of the Navy
Filed Dec. 5, 1966, Ser. No. 599,684
5 Claims. (Cl. 340—10)

ABSTRACT OF THE DISCLOSURE

A hydrophone which has its leads and electrical connections fused into an integral encapsulation with a thermoplastic or rubber compound. A piezoelectric ceramic disk is enclosed in an electrical conductive housing and spacers which allows the ceramic disk to vibrate within the encapsulating material.

The invention described herein may be manufactured and used by or for the Government of the United States of Ameerica for governmental purposes without the payment of any royalties thereon or therefor.

This invention relates to hydrophones, and more particularly to hydrophones which are suitable for deep submergence use.

Hydrophones generally consist of a watertight casing containing a vibratile element which is acoustically coupled to the surrounding water and capable of generating electrical signals in response to underwater acoustical signals impinging on the element. The element must have sufficient space to vibrate within the casing and the casing must be of sufficient strength to withstand high pressures to prevent damage to the vibratile element.

In deep submergence applications such as sonobuoy systems often as many as sixty hydrophones are packed into a small container and lowered to great depths in the ocean. For use at the bottom of the ocean or at extreme depths it is desirable to have small compact hydrophones with sensitivities which are unaffected by the high water pressure.

Previously, many hydrophone constructions have been available but unfortunately most have included the feature of electrical conductors led through the hydrophone housing by means of various types of gland seals. Although satisfactory in many applications, they were unsuitable for deep submergence because of leakage around the seals, as well as being expensive and bulky. More recently attempts have been made to completely encapsule the hydrophone without the use of any gland seals, but problems arise in making hydrophones small and durable and at the same time having sufficient vibratory space to maintain the desired sensitivity required for deep submergence detection of acoustic signals. A great need exists, therefore, for an improved miniturized compact hydrophone which operates satisfactorily with a high degree of sensitivity at deep water depths and over a wide range of pressure variations.

An object of this invention is to provide a new and improved hydrophone.

Another object is the provision of a new and improved completely encapsulated hydrophone.

Still another object is to provide a hydrophone suitable for deep submergence operation.

Yet another object is to provide a small and compact hydrophone exhibiting a high degree of sensitivity relatively independent of its environmental pressures.

These and other objects are attained in accordance with the invention by providing a completely encapsulated hydrophone and electrical lead wires, wherein the hydrophone is provided with a piezoelectric ceramic enclosed in an electrical conductive housing and spacers which allow the ceramic to vibrate within the encapsulating material.

Figure 2:
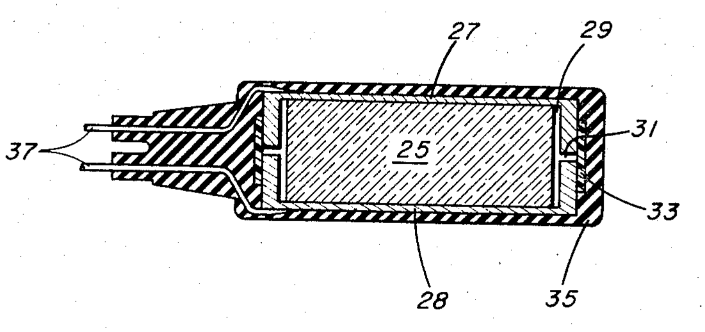
Figure 1:
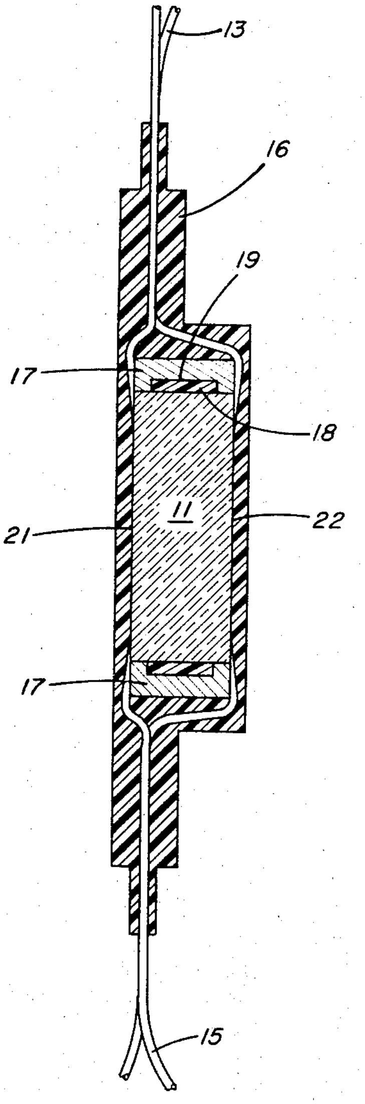

Other objects, features, and attendant advantages of this invention will be readily appreciated as the same becomes better understood by reference to the accompanying drawings wherein:

FIG. 1 is a cross sectional view of one embodiment of the invention made by a molding process; and, FIG. 2 is a cross sectional view of another embodiment of the invention.

Referring now to the drawing, FIG. 1 shows a circular piezoelectric ceramic disk 11 connected to electrically conducting leads 13 and 15 which are enclosed in a plastic molding or housing 16. An electrically conductive ring 17 which may be formed of steel or other suitable material encircles the ceramic disk 11. Also shown in FIG. 1 is a compressible non-metallic spacer 18 which fits in a groove 19 formed inside the ring 17 and presses firmly against the periphery of the disk.

The ceramic 11 is designed for use in a deep submergence sonobuoy system where several small hydrophones are packed closely together and only a minimum amount of space can be allotted to each individually. The size of the ceramic disks as shown in FIGURES 1 and 2 are small, being approximately 1 inch in diameter and ⅜ inch in thickness. During manufacture of the hydrophone, the ceramic is silvered and polarized on its circular faces. The embodiment of FIG. 1, for example, is envisioned with ceramic face 21 polarized positively while face 22 is polarized negatively, although the selection of polarities is optional. The groove 19 of ring 17 is milled out of its inside wall for the insertion of the spacer 18. The spacer 18 is a compliant material such as Corprene so that the ceramic disk will have sufficient room to expand in response to acoustic pressure signals. The edge of ceramic 11 is protected from ambient and signal pressures by the steel ring which holds the spacer securely against the ceramic.

Electrical leads 13, which may go to a junction box (not shown) and electrical leads 15, which may connect to an additional hydrophone (not shown), are soldered to the appropriate ceramic face or steel ring. All of the electrical leads are insulated with plastic such as polyethylene or the like and led through drilled holes in the wide diameter portion of the housing 16. The entire assembly is placed into a suitable differential heating mold and enough raw plastic is added to form the complete housing. The unit is then molded at a temperature sufficiently high to fuse all the plastic, including the insulation on the leads, into one integral piece. The leads may be terminated at fusite seals (not shown) that are soldered into a metal plug. Using the same molding process as for the hydrophone, a plastic preformed body can be molded around the plug and fused to the insulation on the leads.

FIG. 2 shows another hydrophone embodiment wherein a piezoelectric disk 25 is housed in two metallic matching cups designated by references 27 and 28. The upper cup 27 and the lower cup 28 make electrical contact with the silvered and polarized faces of the piezoelectric disk 25 but leave an air space 29 around the disk edge and also leave a small gap 31 between the upper and lower cup walls. The air space 29 and gap 31 are necessary to provide sufficient vibratory space for the ceramic insuring a high degree of sensitivity for the hydrophone. A plastic ring 33 bridges the small gap 31 and prevents extrusion of encapsulation rubber through the gap when the hydrophone is subjected to high pressure.

Before potting, the metal housings 27 and 28 which may be brass or any other suitable electrically conductive metal, are soldered to the electrical wire leads 37. The entire unit including the wire leads are then covered with rubber and cured to form the integral hydrophone unit shown in FIG. 2.

Several new features and advantages of the improved hydrophone will be evident to one skilled in the art from the foregoing disclosure. For example, the size of the unit and small number of elements provide economy of space and ease of construction. By being completely encapsulated, the problem of leakage under high pressures is eliminated while a sensitivity on the order of —94 db relative to volts per dyne per square centimeter is maintained which is independent of depth. The entire hydrophone is small, which enables a plurality of the units to be used in a complex sonobuoy system.

It is now apparent that a new and improved hydrophone has been disclosed which is entirely encapsulated and has sensitivity which is independent of its depth in water. It should be understood, of course, that the foregoing disclosure relates to only specific embodiments of the invention and that numerous modifications or alterations may be made therein without departing from the spirit and scope of the invention as set forth in the appended claims.

What is claimed is:

1. A hydrophone comprising,
a piezoelectric ceramic disk having at least a positively polarized face and a negatively charged face;
matching cup-shaped metallic containers having electrical conductive bottom circular portions covering said faces;
housing means including the ring-shaped walls of said matching cups and a thin plastic ring encircling said walls encircling the circumference of said disk for protecting the ceramic edges and maintaining sufficient radial vibratory space for said ceramic disk;
electrical conductors connected to said conductive means; and
an insulating compound completely encapsulating said disk, conductive means, housing means and electrical conductors.

2. The hydrophone of claim 1 wherein said insulating compound is rubber.

3. A deep submergence hydrophone comprising, a piezoelectric, disk-shaped transducer element having a positively and a negatively polarized face;
upper and lower cup-shaped metallic members each having an inside radius larger than said element and a wall height less than one half of the thickness of said element; said upper member cupped over and making electrical contact with one of said faces, and the lower member cupped over and making electrical contact with the other face, said two members forming an air space around the perimeter of said element and an air gap between the walls of the members;
a plastic ring snug by fitting around the outside of said walls bridging said upper member with said lower member;
a plurality of electrical conductors connected at least one to each metallic member; and
an insulating compound encapsulating said members, plastic ring, and electrical conductors.

4. The hydrophone of claim 3 wherein said insulating compound is rubber.

5. A hydrophone comprising,
a piezoelectric ceramic disk having at least a positively polarized face and a negatively charged face;
electrical conductive silver coating covering said faces;
housing means including a steel ring with an annular groove having a non-metallic spacing means secured therein encircling the circumference of said disk for protecting the ceramic edges and maintaining sufficient radial vibratory space for said ceramic disk;
electrical conductors connected to said conductive means; and
an insulating compound completely encapsulating said disk, conductive means, housing means and electrical conductors.

References Cited

UNITED STATES PATENTS

| | | | |
|---|---|---|---|
| 2,636,134 | 4/1953 | Arons et al. | |
| 3,167,668 | 1/1965 | Nesh | 340—10 |

RODNEY D. BENNETT, *Primary Examiner.*

J. G. BAXTER, *Assistant Examiner.*